US010172013B2

(12) United States Patent
Sun et al.

(10) Patent No.: US 10,172,013 B2
(45) Date of Patent: Jan. 1, 2019

(54) BASE STATION CONTROL METHOD AND APPARATUS USING UNLICENSED FREQUENCY BAND

(71) Applicant: SONY CORPORATION, Tokyo (JP)

(72) Inventors: Chen Sun, Beijing (CN); Xin Guo, Beijing (CN); Zhongbin Qin, Beijing (CN); Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/304,783

(22) PCT Filed: May 27, 2015

(86) PCT No.: PCT/CN2015/079882
§ 371 (c)(1),
(2) Date: Oct. 17, 2016

(87) PCT Pub. No.: WO2015/180637
PCT Pub. Date: Dec. 3, 2015

(65) Prior Publication Data
US 2017/0048721 A1 Feb. 16, 2017

(30) Foreign Application Priority Data
May 27, 2014 (CN) .......................... 2014 1 0227908

(51) Int. Cl.
H04W 16/16 (2009.01)
H04W 72/08 (2009.01)
(Continued)

(52) U.S. Cl.
CPC ........... H04W 16/16 (2013.01); H04W 16/14 (2013.01); H04W 72/085 (2013.01); H04W 16/32 (2013.01)

(58) Field of Classification Search
CPC .............................. H04W 16/16; H04W 72/08
See application file for complete search history.

(56) References Cited

U.S. PATENT DOCUMENTS

2013/0195073 A1  8/2013  Chen et al.
2013/0260780 A1  10/2013  Liu et al.
(Continued)

FOREIGN PATENT DOCUMENTS

CN  102547717 A  7/2012
CN  103338470 A  10/2013
(Continued)

OTHER PUBLICATIONS

International Search Report dated Aug. 25, 2015 in PCT/CN2015/079882 filed May 27, 2015.

Primary Examiner — William D Cumming
(74) Attorney, Agent, or Firm — Xsenus LLP

(57) ABSTRACT

A base station control method for a wireless communication system, a base station control apparatus, a wireless communication system and an electronic device. The wireless communication system includes a small cell. The base station control apparatus includes an upper limit determination unit and a frequency band control unit; wherein the upper limit determination unit is configured to determine the upper limit of the estimated number of small cells using unlicensed frequency bands in a target region according to available unlicensed frequency band resources and estimated service volume in the target region; and the frequency band control unit is configured to control one or more small cells to use or stop using the unlicensed frequency bands according to the upper limit of the estimated number, so that the number of small cells operating at the unlicensed frequency bands is not greater than the upper limit of the estimated number.

12 Claims, 9 Drawing Sheets

(51) Int. Cl.
*H04W 16/14* (2009.01)
*H04W 16/32* (2009.01)

(56) References Cited

U.S. PATENT DOCUMENTS

2014/0010086 A1  1/2014  Etemad et al.
2017/0048721 A1* 2/2017  Sun ..................... H04W 16/16

FOREIGN PATENT DOCUMENTS

| CN | 103718639 A | 4/2014 | | |
| CN | 103763722 A | 4/2014 | | |
| EP | 3151602 A1 * | 4/2017 | ............ | H04W 16/16 |
| KR | 20170008221 A * | 1/2017 | ............ | H04W 16/16 |
| WO | WO 2015180637 A1 * | 12/2015 | ............ | H04W 16/16 |

\* cited by examiner

BASE STATION CONTROL METHOD AND APPARATUS USING UNLICENSED FREQUENCY BAND

FIELD

The disclosure generally relates to the technical field of wireless communications, and in particular to a base station controlling method for a wireless communication system, a base station controlling apparatus for a wireless communication system, and the wireless communication system including the base station controlling apparatus.

BACKGROUND

With the continuous development of wireless communication industry, services for users to transmit data via a wireless network are increased gradually, and the existing available spectrum resources of operators become increasingly difficult to meet users' demands for data. In order to provide more wireless communications capacity for the users, a widely accepted solution is to use additional spectrum resources. While maintaining the use existing frequency band, the users can opportunistically use the additional spectrum resources, such as a television frequency band, a 5 GHz frequency band, to support the user's data communications.

SUMMARY

In the existing solution of opportunistically using an unlicensed (unlicensed) frequency band, different communication systems or different operators may simultaneously use a frequency band when using an unlicensed spectrum, which may cause mutual interference.

A brief summary of the embodiments of the present disclosure are provided below to provide some basic understanding to some aspects of the present disclosure. It should be understood that the summary is not exhaustive, and is not intended to identify a crucial or important part of the present disclosure or limit the scope of the present disclosure. The only purpose is to give some conception in a simplified manner as a prelude to the detailed description provided later.

In an aspect of the disclosure, a base station controlling method for a wireless communication system is provided, wherein the wireless communication system contains a small cell. The method includes a step of determining an upper limit for the number of small cells using an unlicensed frequency band in a target area according to available unlicensed frequency band resources and an estimated traffic in the target area. The method further includes a step of controlling one or more small cells to stop operating in the unlicensed frequency band in a case that the number of the small cells operating in the unlicensed frequency band is greater than the upper limit, so that the number of the small cells operating in the unlicensed frequency band is not greater than the upper limit.

In another aspect of the disclosure, a base station controlling apparatus for a wireless communication system is provided, wherein the wireless communication system contains a small cell. The base station controlling apparatus includes: an upper limit determination unit and a number controlling unit. The upper limit determination unit is configured to determine an upper limit for the number of small cells using an unlicensed frequency band in a target area according to available unlicensed frequency band resources and an estimated traffic in the target area. The number controlling unit is configured to control one or more small cells to stop operating in the unlicensed frequency band in a case that the number of the small cells operating in the unlicensed frequency band is greater than the upper limit, so that the number of the small cells operating in the unlicensed frequency band is not greater than the upper limit.

In yet another aspect of the disclosure, a wireless communication system is provided, which includes a small cell and the base station controlling apparatus according to an embodiment of the disclosure.

In still another aspect of the disclosure, a wireless communication system is provided, which includes a control module and a synchronization module. The control module is configured to control the usage of an unlicensed frequency band of a first cell. The control module includes a time slot determination unit configured to determine a time slot configuration for the first cell to use the unlicensed frequency band resource, the time slot configuration including a judging time slot and a using time slot, so that the first cell does not use the unlicensed frequency band and determines whether another device is using the unlicensed frequency band in the judging time slot. In a case that it is determined in the judging time slot that no other device is using the unlicensed frequency band, communication is performed using the unlicensed frequency band in the using time slot. The synchronization module is configured to synchronize the time slot configurations of the first cell and a second cell in a case that it is determined that the first cell is interfered by the second cell using the unlicensed frequency band, so that the judging time slots of the first cell and the second cell are synchronized.

In still another aspect of the disclosure, an electronic device is provided, which includes a time slot configuration module, a judging module and a signal transmission control module. The time slot configuration module receives time slot configuration information on the electronic device from a control terminal and perform corresponding configuration. Wherein the time slot configuration includes a judging time slot and a using time slot. The judging module determines in the judging time slot whether another device is using an unlicensed frequency band based on the time slot configuration. Based on the time slot configuration, the signal transmission control module does not use the unlicensed frequency band to transmit a signal in the judging time slot, and uses the unlicensed frequency band to transmit the signal in the using time slot in a case that it is determined by the judging module in the judging time slot that no other device is using the unlicensed frequency band. It is intermittently detected by the judging module in the using time slot whether another device is using the unlicensed frequency band, and the detected other device is reported by the judging module to the control terminal.

In still another aspect of the disclosure, an electronic device is provided, which includes a carrier aggregation module and a control module. The carrier aggregation module is configured to perform carrier aggregation communication with a first cell and a second cell via a first carrier operating over an unlicensed frequency band and a second carrier operating over a licensed frequency band, respectively. The control module is configured to determine a time slot configuration including a judging time slot and a using time slot for the first cell to use the unlicensed frequency band, and control the electronic device to not monitor a signal of the first cell in the judging time slot and to acquire a control signaling from the second cell at least in the judging time slot.

According to an embodiment, a base station controlling apparatus for a wireless communication system is provided, wherein the wireless communication system contains a small cell. The base station controlling apparatus includes: an upper limit determination unit and a frequency band controlling unit. The upper limit determination unit is configured to determine an estimated upper limit for the number of small cells using an unlicensed frequency band in a target area according to available unlicensed frequency band resources and an estimated traffic in the target area. The frequency band controlling unit is configured to control one or more small cells to operate or stop operating in the unlicensed frequency band based on the estimated upper limit for the number, so that the number of the small cells operating in the unlicensed frequency band is controlled to be not greater than the estimated upper limit for the number.

According to another embodiment, a base station controlling method for a wireless communication system is provided, wherein the wireless communication system contains a small cell. The method includes a step of determining an estimated upper limit for the number of small cells using an unlicensed frequency band in a target area according to available unlicensed frequency band resources and an estimated traffic in the target area. The method further includes a step of controlling one or more small cells to operate or stop operating in the unlicensed frequency band based on the estimated upper limit for the number, so that the number of the small cells operating in the unlicensed frequency band is not greater than the estimated upper limit for the number.

The embodiments of the present disclosure are advantageous for ensuring the communication quality in a case of opportunistically using an unlicensed frequency band.

BRIEF DESCRIPTION OF THE DRAWINGS

The present disclosure can be better understood by referring to the following description taken in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF EMBODIMENTS

Embodiments of the present disclosure are described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity.

A base station controlling method according to an embodiment of the disclosure may be applied to a wireless communication system containing a small cell. The small cell base station is a wireless access point with lower power, which includes, e.g., a femtocell base station, a picocell base station, a microcell base station and the like. The small cell base station is deployed indoor or outdoor by the operator, in order to improve the coverage of a macro base station and enhance network capacity, etc. It should be noted that, although the small cell is taken as an example of a control object in the following exemplary embodiments, the present disclosure is not limited to the control of the small-cell, and various specific areas using an unlicensed frequency band in a wireless communication system may be controlled. For example, in a case that one or more of multiple sectors of the macro base station use unlicensed frequency spectrum resources, the switching of the sectors may be controlled according to the solution of the disclosure. Therefore, the term "small cell" herein should be broadly interpreted to include a variety of specific areas which can use an unlicensed frequency band.

Figure 1:
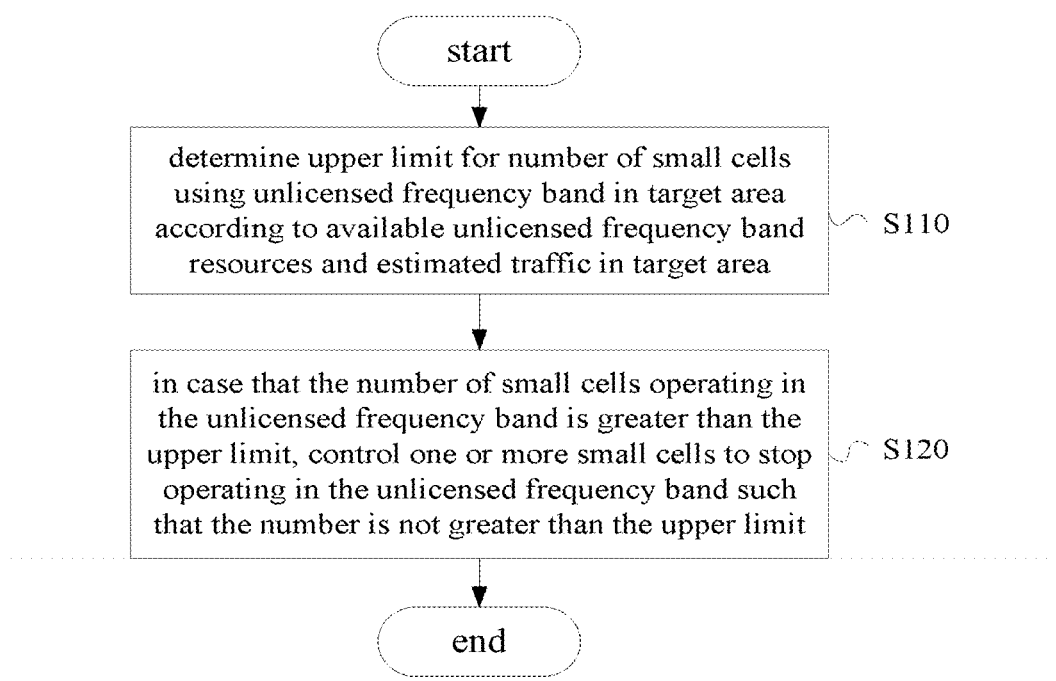
FIG. 1 is a flow chart showing a process example of a base station controlling method for a wireless communication system according to an embodiment of the disclosure.

As shown in FIG. 1, a base station controlling method according to an embodiment of the disclosure may include a step of determining an upper limit for the number of small cells using an unlicensed frequency band in a target area according to available unlicensed frequency band resources and an estimated traffic in the target area (S110), and a step of controlling one or more small cells to stop operating in the unlicensed frequency band in a case that the number of the small cells operating in the unlicensed frequency band is greater than the determined upper limit, so that the number of the small cells operating in the unlicensed frequency band is not greater than the upper limit (S120).

The target area is an area as a control target of the base station controlling method, that is, the small cell base station in the area is controlled with the base station controlling method. The target area may correspond to: the coverage area of a macro base station, specific areas (such as a specified area, an area having a specific traffic level (in a specific period of time)) in which a small cell is arranged in the coverage area of a macro base station, an area of a specific coverage type (such as overlapping with a coverage area of another macro base station, or not overlapping with the coverage area of another macro base station) or the like. The target area may be specified in advance, or may also be dynamically adjusted according to actual operating conditions (for example, traffic levels and coverage types).

With the base station controlling method according to the embodiment, the upper limit of the number of small cells opportunistically using an unlicensed frequency band is determined, the number of small cells actually using the unlicensed frequency band is controlled to be not greater than the upper limit, so that the communication quality in the target area reaches a predetermined level in probability. That is, the method may not specifically determine which small cell or small cells actually using the unlicensed frequency band, and which small cell or small cells are controlled to stop using the unlicensed frequency band in a case that the number of small cells using the unlicensed frequency band is greater than the determined upper limit of the number, but only control the total number of the small cells using the unlicensed frequency band.

A variety of manners may be adopted to determine which small cell or small cells are controlled to use or stop using the unlicensed frequency band. For example, a small cell with a high traffic (the number of users or data traffic) may be preferentially controlled to use the unlicensed frequency band, and a small cell with a low traffic may be preferentially controlled to stop using the unlicensed frequency band. Alternatively, the small cell using or stopping using the unlicensed frequency band may be determined according to the spatial distribution of the small cell, so that the spatial distribution of small cells using the unlicensed frequency band in the target area is uniform. Alternatively, the small cell using or stopping using the unlicensed frequency band may be determined randomly.

In addition, the allocation of the unauthorized frequency band between the small cells may be determined with the methods known in the art. For example, in an LTE (long term evolution) system, information is exchanged between small cells via an X2 interface to allocate the unlicensed frequency band resources. Alternatively, the allocation of unlicensed frequency band resources may be determined at a macro base station or a core network side.

A variety of ways may be used to determine the upper limit of the number of small cells using the unlicensed frequency band. For example, the total number of small cells in the target area multiplied by a ratio may be used as the upper limit of the number. Alternatively, a capacity determining method for common-frequency systems well known in the art may be used to determine the upper limit of the number.

According to an embodiment of the disclosure, the upper limit for the number may be determined based on the estimation of communication quality. Specifically, the upper limit may be determined such that, in a case that the number of small cells operating in the unlicensed frequency band in the target area is not greater than the upper limit, the probability that a communication using the unlicensed frequency band satisfies a predetermined communication quality level reaches a predetermined threshold.

Specifically, a variety of interference indexes well known in the art may be used, such as a signal to interference plus noise power ratio or an outage probability, and the probability that communication using the unlicensed frequency band satisfies a predetermined communication quality level is estimated (for example, a proportion of users for which the communication satisfies the predetermined communication quality level with respect to the users using the unlicensed frequency band), and thus the upper limit of the number of small cells using the unlicensed frequency band which corresponds to a predetermined probability threshold is determined.

Furthermore, in an embodiment of the disclosure, communications of non-guaranteed bit rate service is performed by the small cells using the unlicensed frequency band, and the user terminal transmits control signaling and performs data communications of which the quality of service needs to be guaranteed with the macro base station using a licensed frequency band, for example, which may be achieved through carrier aggregation. For example, reference is made to US 20130195073 A1, "Low-Cost LTE System with Distributed Carrier Aggregation on the Unlicensed Band".

A licensed existing system which legally uses the unlicensed frequency band (for the small cell) may exist in the coverage range of the small cell, for example, a radar system of 5 GHz legally using the frequency band of 5 GHz and a WiFi (wireless network) system of 2.4 GHz legally using the frequency band of 2.4 GHz. Therefore, in some embodiments of the disclosure, the protection of the existing system using the unlicensed frequency band is taken into account while the small cells is controlled to use the unlicensed frequency band, in order to achieve a reasonable usage of the unlicensed frequency band between the existing system and the small cell.

Figure 2:
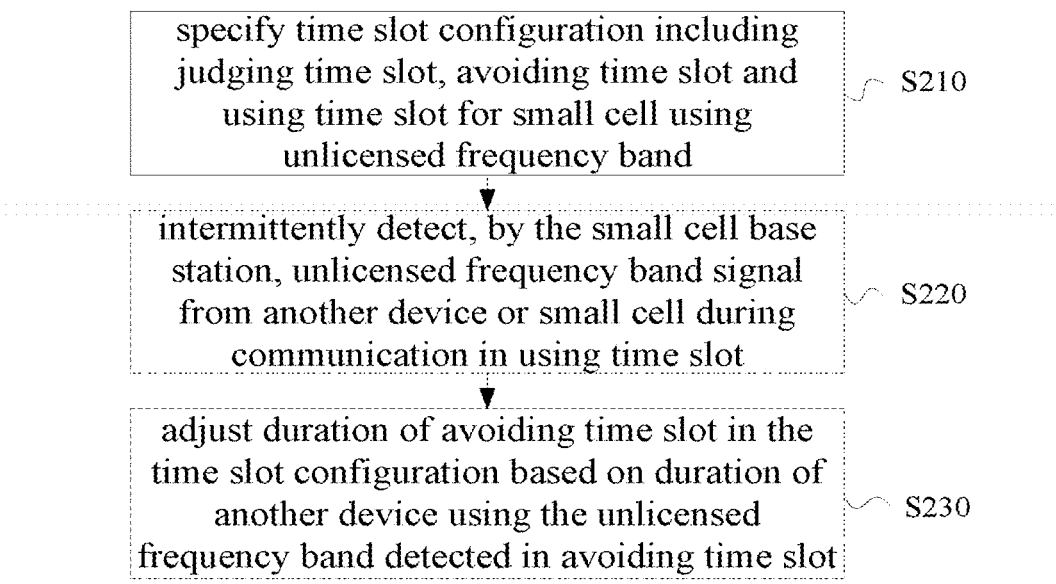
FIG. 2 is a flow chart showing a sub process example of a base station controlling method according to another embodiment.

As shown in FIG. 2, a base station controlling method according to an embodiment of the disclosure further includes a step S210 of specifying a time slot configuration for the small cell using the unlicensed frequency band. The time slot configuration may include a judging time slot, an avoiding time slot and a using time slot.

Figure 3:
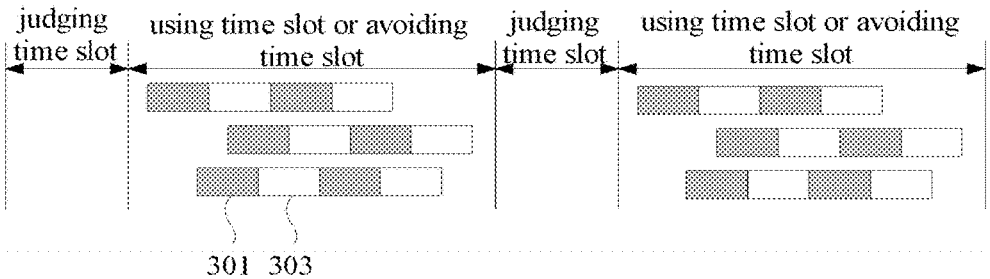
FIG. 3 is a schematic diagram for illustrating a time slot setting example specified by a base station controlling method according to an embodiment.

In the judging time slot, the communication using the unlicensed frequency band is stopped and it is determined whether another device (the existing system using the unlicensed frequency band, such as a radar, WiFi) is using the unlicensed frequency band. In a case that it is determined in the judging time slot that the other device is using the unlicensed frequency band, the following time slot is the avoiding time slot. In the avoiding time slot, the communication using the unlicensed frequency band is suspended. In a case that it is determined in the judging time slot that no other device is using the unlicensed frequency band, the following time slot is the using time slot. In the using time slot, the unlicensed frequency band is used for communication. FIG. 3 shows a schematic diagram of an example of time slot setting. For example, in the LTE system, the small cell base station may send the set time slot information to a mobile terminal via an SIB (system information block), and communications between the small cell base station and the mobile terminal is performed according to the set time slot.

The durations of the judging time slot, the avoiding time slot and the using time slot may be set in various ways. For example, the duration allocation of time slot may be set or adjusted dynamically according to the utilization ratio of the unlicensed frequency band by the existing system using the unlicensed frequency band in a specific period of time and/or area.

In addition, although it is determined in the judging time slot that another device is using the unlicensed frequency band so that the communication using the unlicensed frequency band is suspended in the avoiding time slot in the configuration example, the avoiding time slot may also not be set separately. For example, a part or all of the using time slot may be set as that the unlicensed frequency band is not used therein for avoiding, or the judging time slot may be repeated once again.

Furthermore, the time slot setting may be adjusted dynamically according to the detection result for the existing system. In an embodiment, the duration of the avoiding time slot in the time slot setting is adjusted based on the duration of another device using the unlicensed frequency band which is detected in the avoiding time slot.

Specifically, in a case that it is determined in the judging time slot that another device is using the unlicensed frequency band, the other device using the unlicensed frequency band is monitored to determine the usage duration in the following avoiding time slot. For example, when it is determined that the usage duration is long, the duration of the avoiding time slot may be prolonged properly to reduce the interference with the other device; when it is determined that the usage duration is short, the duration of the avoiding time slot may be reduced properly to improve the efficiency of the present system using the unlicensed frequency band.

In addition, according to an embodiment, in a process of communications in the using time slot, the small cell base station intermittently detects an unlicensed frequency band signal from other devices or other small cell base stations. As shown in FIG. 3, when communications is performed in the using time slot, the small cell base station may use the unlicensed frequency band in a way of alternating a communication time slot 301 and a detection time slot 303. For example, the communication using the unlicensed frequency band is performed in the communication time slot 301, and interference signals are detected in the detection time slot 303. The interference signals may come from other device using the unlicensed frequency band, such as a radar or WiFi, or may also come from other small cell base stations using the unlicensed frequency band. As will be described in more detail below, the interfering small cell may be a small cell of the present system, or may also be a small cell in another system (of the same operator or a different operator). For example, it may be determined that whether the received interference signal comes from the same system or a different system based on an ID of the detected cell or a cell manager ID. The information may be used to modify overlapping coverage areas of different systems determined in advance based on the coverage area, or modify potential interfering cell information. An example of determining and modifying coverage types will be illustrated specifically with reference to FIG. 16 below.

When the unlicensed frequency band signal from another device is detected in the using time slot, the communication in the using time slot may be suspended, and the next using time slot is waited. In a case that the interference signal is from another small cell of the system, the allocation of the unlicensed frequency band resources may be adjusted by exchanging information between the small cells, for example, via the X2 interface in the LTE, to avoid the interference between neighboring small cells. In a case that the interference signal is from a small cell of another system, the allocation of resources may be adjusted by exchanging information between different systems, to achieve the predetermined communication quality. For example, as described below, no X2 interface is provided between small cells of different systems, and it is unable to directly exchange information to achieve spectrum allocation. In this case, after the upper limit of the number of the small cells in the overlapping coverage areas of different systems is determined, the upper limit of the number of the small cells in each system is determined according to different demands of the systems.

Next, a sub process of a base station controlling method according to an embodiment is illustrated with reference to FIG. 4. The embodiment is directed to a case that the target area is an overlapping coverage area, that is, the coverage area of the system overlaps with that of another system.

Figure 4:
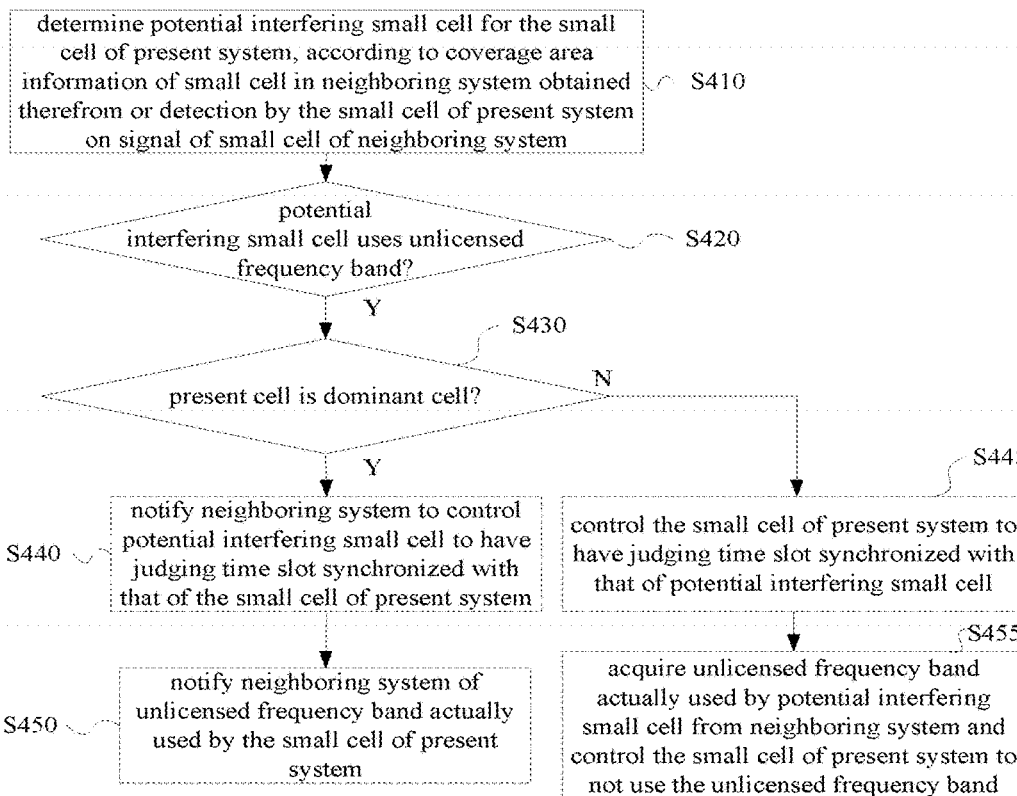
FIG. 4 is a flow chart showing a sub process example of a base station controlling method according to yet another embodiment.

As shown in FIG. 4, the base station controlling method according to the embodiment further includes a step of determining a potential interfering small cell for the small cell of the present system (S410). In step S410, the potential interfering small cell is determined according to coverage area information of a small cell in a neighboring system obtained from the neighboring system or detection on a signal of a small cell of the neighboring system by the small cell of the present system.

Here, the potential interfering small cell may be a small cell using the unlicensed frequency band, or may also be a small cell not using the unlicensed frequency band. The coverage area of the potential interfering small cell overlaps with that of the small cell of the present system or is close to the small cell of the present system. Therefore, interference on the small cell of the present system may be caused by the potential interfering small cell when it also using the unlicensed frequency band, hence it is referred to as the potential interfering small cell.

For example, in step S410, the coverage area information of the small cell of the neighboring system may be obtained by exchanging information with the neighboring system, the small cell of the neighboring system is determined to be a potential interfering small cell for the small cell of the present system in a case that the coverage area of the small cell of the neighboring system overlaps with that of the small cell of the system or a distance between the small cell base station of the neighboring system and the small cell base station of the present system is less than a predetermined threshold. Alternatively, a potential interfering small cell may also be determined by the small cell base station of the present system by detecting a signal of the small cell base station of the neighboring system. For example, in a case that an intensity of the detected signal of the small cell base station of the neighboring system (the signal may be a signal in the licensed frequency band or a signal in the unlicensed frequency band) is greater than a predetermined threshold, the small cell base station of the neighboring system is determined to be a potential interfering small cell. As mentioned above, it may be determined whether the received interference signal is from the same system or a different system based on an ID of the detected cell or a cell manager ID.

In a case that the determined potential interfering small cell uses the unlicensed frequency band, the base station controlling method according to the embodiment of the disclosure may include a step of coordinating with the other system. As shown in FIG. 4, in an embodiment, in a case that the potential interfering small cell uses the unlicensed frequency band (it is determined to be Y in step S420), the method may further include a step of synchronizing a judging time slot of the small cell of the present system and a judging time slot of the small cell of the neighboring system (S440 and S445).

As mentioned above, the communication using the unlicensed frequency band is stopped for the small cell and it is determined whether another device such as a radar or WiFi is using the unlicensed frequency band in the judging time slot. The step of synchronizing a judging time slot of the small cell of the present system and a judging time slot of the small cell of the neighboring system is to avoid misidentifying an unlicensed frequency band signal of the small cell in the other system as a signal of the other device such as a radar or WiFi.

Specifically, in a case that the present cell is a dominant cell (Y in S430), the neighboring system is notified to control the potential interfering small cell to have a judging time slot synchronized with that of the small cell of the present system (S440). In a case that the present cell is not a dominant cell (N in S430), the judging time slot of the potential interfering small cell is acquired from the neighboring system, and the small cell of the present system is controlled to have a judging time slot synchronized with that of the potential interfering small cell. Various ways may be used to determine the dominant cell. For example, the dominant cell is determined according to predetermined appointment, or a small cell which first detects the potential interfering small cell is determined to be the dominant cell.

In addition, the step of coordinating with the other system may further include coordinating the unlicensed frequency band actually used. In an embodiment, in a case that the potential interfering small cell uses the unlicensed frequency band (it is determined to be Y in step S420), the base station controlling method may further include a step of coordinating usages of unlicensed frequency band resources by the small cell of the present system and the small cell of the neighboring system (S450, S455).

Specifically, in a case that the present cell is a dominant cell (Y in S430), the neighboring system is notified of the unlicensed frequency band actually used by the small cell of the present system (S450). In a case that the present cell is not a dominant cell (N in S430), the unlicensed frequency band actually used by the potential interfering small cell is acquired from the neighboring system and the small cell of the present system is controlled to not use the unlicensed frequency band (S455).

The probability of communication quality reduction due to interference caused by the neighboring system using the same unlicensed frequency band can be avoided by coordinating usages of the unlicensed frequency band resources by the small cell of the present system and the small cell of the neighboring system.

In a case that the target area is an overlapping coverage area, the small cell of the neighboring system in the target area may also be taken into account in the process of determining the upper limit for the number of small cells using the unlicensed frequency band in the target area. In an embodiment, in a case that a potential interfering small cell exists in a target area, the upper limit for the number of small cells of the present system and the number of potential interfering small cells using the unlicensed frequency band in the target area are determined according to traffics of the small cells of the present system and the potential interfering small cell in the target area. That is, in a case that the target area is the overlapping coverage area and the small cells of the present system using the unlicensed frequency band may be interfered by the small cells of another system in the overlapping coverage area, the upper limit for the total number of the small cells using the unlicensed frequency band is determined by taking the small cells of the present system and the small cells of the other system in the target area into account, and the upper limits for the number of the small cells of the present system and the number of the small cells of the neighboring system using the unlicensed frequency band in the target area are determined according to the upper limit for the total number. According to the respective upper limits for the number, the small cells of the present system may be controlled, and, for example, the neighboring system may be notified by exchanging information between the systems, to control the small cells of the neighboring system, so that the total number of the small cells using the unlicensed frequency band in the target area is not greater than the determined upper limit for the total number.

In a specific embodiment, in a case that a potential interfering small cell exists in a target area, the allocation of the number of small cells of the present system and the number of potential interfering small cells of the other system using the unlicensed frequency band in the target area is determined according to the ratio of the traffic of the small cells of the present system to the traffic of the potential interfering small cells of the other system in the target area. That is, on the basis that the upper limit for the total number of the small cells of the present system and the small cells of the neighboring system using the unlicensed frequency band is determined, the allocation of the number of small cells of the present system and the number of small cells of the neighboring system using the unlicensed frequency band is further determined according to the traffics, and thus the unlicensed frequency band resources are allocated more reasonably. In addition, other ways for number allocation may also be used, for example, the upper limits for the number of small cells of the present system and the number of small cells of the neighboring system may be determined according to a ratio of the number of small cells of the present system to the number of small cells of the neighboring system in the target area, or the number of small cells using the unlicensed frequency band may be allocated equally.

In an example of the disclosure, time slot configuration information may be notified by exchanging information between systems, to synchronize time slot configurations of small cells. The exchange between systems may include mutually sending information between the present system and another system, or may also include unilaterally sending information. More specifically, for example, different systems may have different levels. In a case that one of two systems is a dominant system (thus which time slot configuration to be used may be determined), only one system is required to provide the information. For example, a time slot configuration of a first cell is provided by the dominant system to a dependent system, and the dependent system is controlled to be adjusted according to the time slot configuration. However, the disclosure is not limited to the exemplary interacting manners.

Next, configuration examples of a base station controlling apparatus for a wireless communication system according an aspect of the disclosure are illustrated with reference to FIG. 5 to FIG. 7.

Figure 5:
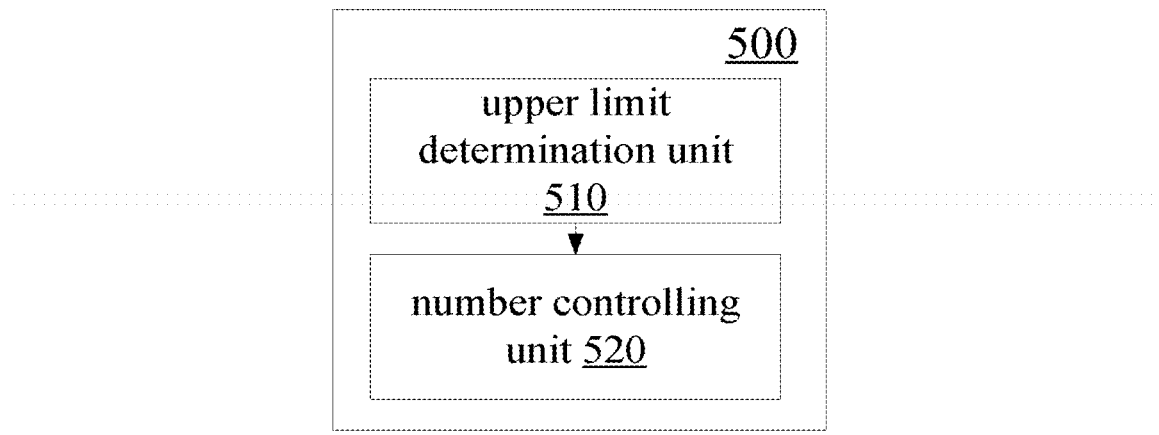
FIG. 5 is a block diagram showing a configuration example of a base station controlling apparatus for a wireless communication system according to an embodiment.

As shown in FIG. 5, a base station controlling apparatus 500 according to an embodiment of the disclosure includes an upper limit determination unit 510 and a number controlling unit 520.

The upper limit determination unit 510 is configured to determine an upper limit for the number of small cells using an unlicensed frequency band in a target area according to available unlicensed frequency band resources and an estimated traffic in the target area.

According to an embodiment, the upper limit for the number is determined by the upper limit determination unit 5 according to the following criteria: in a case that the number of small cells operating in the unlicensed frequency band in the target area is not greater than the upper limit, the probability that a communication using the unlicensed frequency band satisfies a predetermined communication quality level reaches a predetermined threshold.

The number controlling unit 520 is configured to control one or more small cells to stop operating in the unlicensed frequency band in a case that the number of the small cells operating in the unlicensed frequency band is greater than the upper limit, so that the number of the small cells operating in the unlicensed frequency band is not greater than the upper limit.

Figure 6:
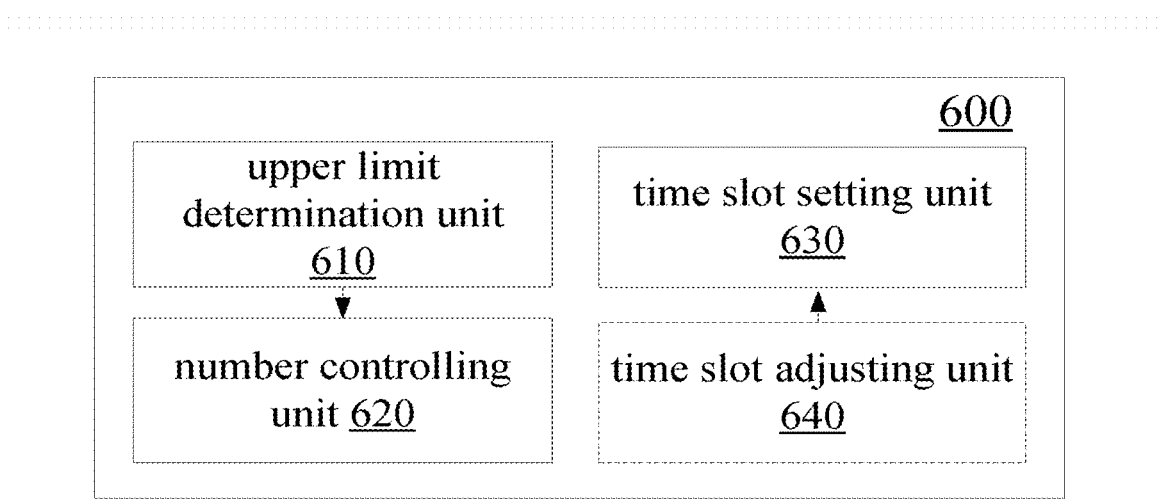
FIG. 6 is a block diagram showing a configuration example of a base station controlling apparatus according to another embodiment.

As shown in FIG. 6, a base station controlling apparatus 600 according to another embodiment of the disclosure includes an upper limit determination unit 610, a number controlling unit 620 and a time slot setting unit 630. The upper limit determination unit 610 and the number controlling unit 620 are similar to the upper limit determination unit 510 and the number controlling unit 520. The time slot setting unit 630 is configured to specify a time slot configuration for the small cell using the unlicensed frequency band. The time slot configuration includes a judging time slot, an avoiding time slot and a using time slot. In the judging time slot, the communication using the unlicensed frequency band is stopped and it is determined whether another device such as a radar or WiFi is using the unlicensed frequency band. In a case that it is determined in the judging time slot that another device is using the unlicensed frequency band, the communication using the unlicensed frequency band is suspended in the avoiding time slot. In a case that it is determined in the judging time slot that no other device is using the unlicensed frequency band, the unlicensed frequency band is used for communication in the using time slot.

Although it is determined in the judging time slot that the other device is using the unlicensed frequency band and the communication using the unlicensed frequency band is suspended in the avoiding time slot in the configuration example, the avoiding time slot may also not be set separately. For example, a part or all of the using time slot may be set as that the unlicensed frequency band is not used therein for avoiding, or the judging time slot may be repeated once again.

Furthermore, as shown in FIG. 6, the base station controlling apparatus according to an embodiment of the disclosure may further include a time slot adjusting unit 640. The time slot adjusting unit 640 is configured to adjust a duration of the avoiding time slot in the time slot configuration according to the duration of the other device using the unlicensed frequency band detected in the avoiding time slot. For example, when the duration of the other device using the unlicensed frequency band is long, the duration of the avoiding time slot may be prolonged properly to reduce the interference with the other device; when the usage duration is short, the duration of the avoiding time slot may be reduced properly to improve the efficiency of the present system using the unlicensed frequency band.

Figure 7:
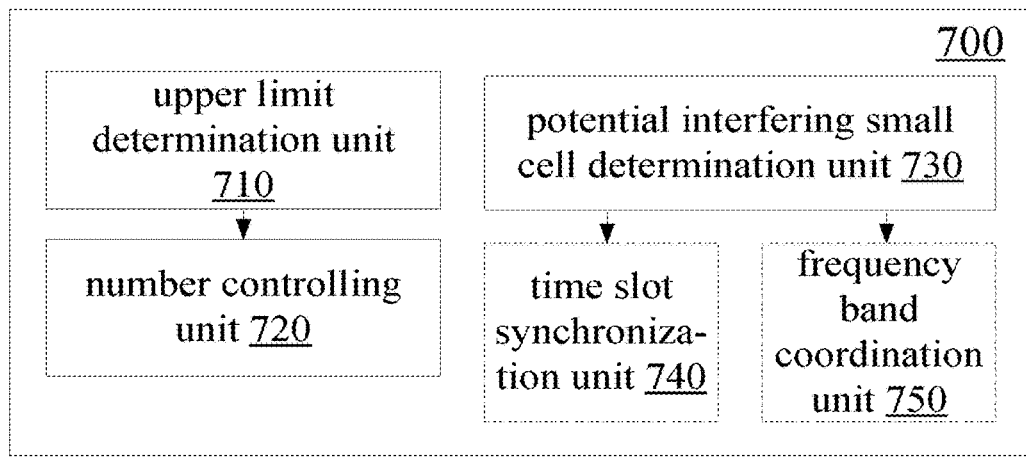
FIG. 7 is a block diagram showing a configuration example of a base station controlling apparatus according to yet another embodiment.

As shown in FIG. 7, a base station controlling apparatus 700 according to another embodiment of the disclosure includes an upper limit determination unit 710, a number controlling unit 720 and a potential interfering small cell determination unit 730. The upper limit determination unit 710 and the number controlling unit 720 are similar to the upper limit determination units and the number controlling units described above. The potential interfering small cell determination unit 730 is configured to determine a potential interfering small cell for a small cell of the present system according to coverage area information of a small cell in a neighboring system obtained from the neighboring system or detection on a signal of the small cell of the neighboring system by the small cell of the present system. Although not shown in FIG. 7, the potential interfering small cell determination unit 730 may include a unit configured to acquire the coverage area information of the small cell in the neighboring system or a unit configured to detect the signal of the small cell in the neighboring system.

In an embodiment, the upper limit determination unit 710 may be configured to determine the upper limits for the number of small cells of the present system and the number of potential interfering small cells using the unlicensed frequency band in the target area according to traffics of the small cells of the present system and the potential interfering small cells in the target area, in a case that it is determined by the potential interfering small cell determination unit 730 that the potential interfering small cell exists in the target area.

For example, in a case that the target area is an overlapping area and the small cells of the present system using the unlicensed frequency band may be interfered by the small cell of the other system in the overlapping area, the upper limit determination unit 710 determines the upper limit for the total number of the small cells using the unlicensed frequency band by taking the small cells of the present system and the small cells of the other system in the target area together into account, and determine the upper limits for the number of small cell base stations of the present system and the number of small cell base stations of the neighboring system using the unlicensed frequency band in the target area according to the upper limit for the total number. The number controlling unit 720 may control the small cell base stations of the present system and, for example, notify the neighboring system to control the small cell base stations of the neighboring system in the target area via a communication unit (not shown in FIG. 7), according to the upper limits for the numbers, so that the total number of the small cell base stations using the unlicensed frequency band in the target area is not greater than the determined upper limit for the total number.

In a specific embodiment, the upper limit determination unit 710 may be configured to determine the allocation of the number of small cells of the present system and the number of potential interfering small cells using the unlicensed frequency band in the target area, according to a ratio of the traffic (such as the number of users, or data traffic) of the small cells of the present system to the traffic of the potential interfering small cells.

Furthermore, as shown in FIG. 7, the base station controlling apparatus according to an embodiment of the disclosure may include a time slot synchronization unit 740 configured to, in a case that the potential interfering small cell is using the unlicensed frequency band, notify the neighboring system to control the potential interfering small cell to use a judging time slot synchronized with that of the small cell of the present system or making the small cell of the present system use a judging time slot synchronized with that of the potential interfering small cell. As mentioned above, in the judging time slot, the communication using the unlicensed frequency band is stopped and it is determined whether another device is using the unlicensed frequency band. Although not shown in FIG. 7, the time slot synchronization unit 740 may include a unit configured to send time slot setting information to the neighboring system or receive the time slot setting information from the neighboring system.

In addition, as shown in FIG. 7, the base station controlling apparatus according to an embodiment of the disclosure may further include a frequency band coordination unit 750 configured to, in a case that the potential interfering small cell is using the unlicensed frequency band, notify the neighboring system of the unlicensed frequency band actually used by the small cell of the present system, or acquire the unlicensed frequency band actually used by the potential interfering small cell from the neighboring system and control the small cell of the present system to not use the unlicensed frequency band. Although not shown in FIG. 7, the frequency band coordination unit 750 may include a unit configured to send frequency band using information to the neighboring system or receive the frequency band using information from the neighboring system.

Figure 8:
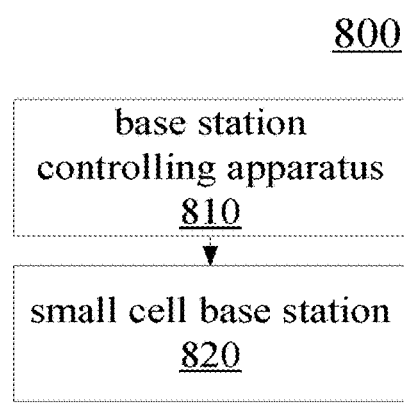
FIG. 8 is a block diagram showing a configuration example of a wireless communication system according to an embodiment.

FIG. 8 shows a block diagram of a configuration example of a wireless communication system according to an embodiment of the disclosure. The wireless communication system 800 includes a small cell base station 820 and a base station controlling apparatus 810. The base station controlling apparatus 810 may be configured as described in the above embodiments, which can determine an upper limit for the number of small cells operating in the unlicensed frequency band in a target area within a coverage area of the wireless communication system 800, and control the small cell base station to stop operating in the unlicensed frequency band in a case that the number of the small cells operating in the unlicensed frequency band is greater than the determined upper limit, so that the number of the small cells operating in the unlicensed frequency band is not greater than the upper limit.

The base station controlling apparatus 810 may have various configurations described with reference to FIG. 5 to FIG. 7.

Figure 9:
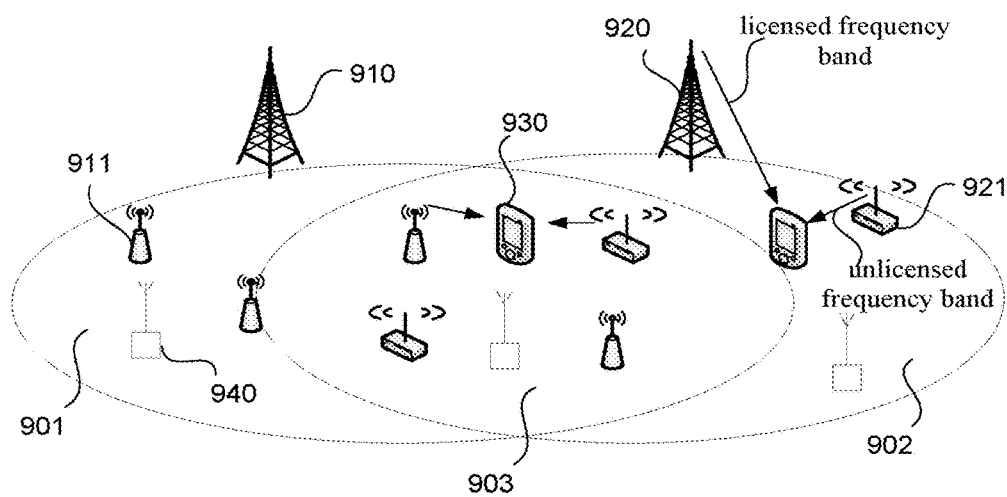
FIG. 9 is a schematic diagram for illustrating a wireless communication system according to an embodiment of the disclosure.

The wireless communication system according to the embodiment of the disclosure is further illustrated with reference to a schematic diagram in FIG. 9 below. FIG. 9 shows two wireless communication systems having overlapping coverage areas. A first system includes a macro base station 910 and several small cell base stations 911, and a second system includes a macro base station 920 and several small cell base stations 921. Furthermore, a mobile terminal 930 is also shown in FIG. 9. For example, the mobile terminal 930 may communicate a control signaling and guaranteed bit rate service with the macro base station, and may perform non-guaranteed bit rate communications such as data communications with the small cell base station through the unlicensed frequency band. As shown in FIG. 9, several devices using the unlicensed frequency band (such as a radar and WiFi) exist within the coverage range of the macro base stations 910 and 920. Furthermore, FIG. 9 indicates an area 901 covered by only the macro base station 910, an area 902 covered by only the macro base station 920 and an overlapping coverage area 903 covered by the macro base station 910 and the macro base station 920.

For a target area within the non-overlapping coverage area 901 or 902, the base station controlling apparatus (not shown in FIG. 9, which may be arranged in the macro base station, the small cell base station or at the core network side) determines the upper limit for the number of small cells using the unlicensed frequency band and controls the small cells according to the upper limit for the number. For a target area within the overlapping coverage area 903, the base station controlling apparatus determines the upper limits for the number of small cells of the present system and the number of potential interfering small cells using the unlicensed frequency band in the target area, for example, by exchanging information between the macro base station (for example 910) of the present system and the macro base station (for example 920) of the neighboring system or according to the detection on a signal of the small cell base station 921 of the neighboring system by the small cell base station 911 of the present system, and controls the small cell base stations of the present system and notifies the neighboring system to control the small cell base station thereof by exchanging information between the macro base stations, so that the number of small cells using the unlicensed frequency band in the target area is not greater than the upper limit for the number.

Figure 10:
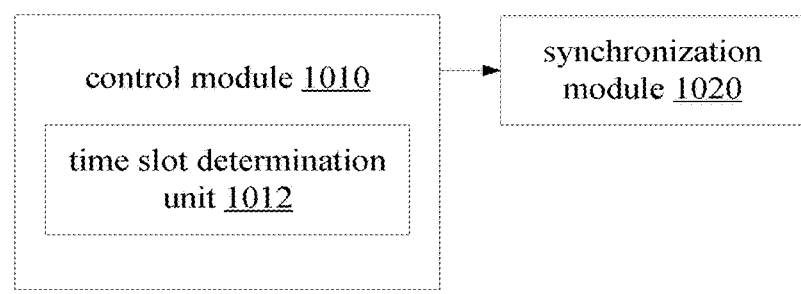
FIG. 10 is a block diagram showing a configuration example of a wireless communication system according to an embodiment.

As shown in FIG. 10, in an embodiment of the disclosure, a wireless communication system 1000 is provided, which includes a control module 1010 and a synchronization module 1020.

It should be noted that, components of the system may be arranged on a device (for example a chip), or may also be separately arranged on multiple devices. For example, the control module may be arranged in operation, management and maintenance devices (OAM) or a mobile management entity (MME), and the synchronization module may be arranged in the small cell base station. In an example, the whole system is arranged in the OAM, MME or the macro base station. In another example of the disclosure, different systems are managed by different network operators.

The control module 1010 is configured to control the usage of an unlicensed frequency band by a first cell.

The control module 1010 includes a time slot determination unit 1012 configured to determine a time slot configuration for the first cell to use the unlicensed frequency band resource. The time slot configuration may include a judging time slot and a using time slot. The control module 1010 may be configured to control the first cell to not use the unlicensed frequency band and determine whether another device is using the unlicensed frequency band in the judging time slot. In a case that it is determined in the judging time slot that no other device is using the unlicensed frequency band, communication is performed using the unlicensed frequency band in the using time slot.

The synchronization module 1020 is configured to synchronize the time slot configurations of the first cell and a second cell, in a case that it is determined that the first cell is interfered by the second cell using the unlicensed frequency band, so that the judging time slots of the first cell and the second cell are synchronized.

In addition, the time slot configuration determined by the time slot determination unit 1012 may further include an avoiding time slot, and the control module 1010 may be configured to suspend the communication using the unlicensed frequency band in a case that it is determined in the judging time slot that another device is using the unlicensed frequency band. However, the avoiding time slot may also not be set separately. For example, a part or all of the using time slot may be set as that the unlicensed frequency band is not used therein for avoiding, or the judging time slot may be repeated once again. In an example, the other device is a authorized device having a legal right to use the unlicensed frequency band, to protect the authorized device to operate normally in the respective frequency band.

In addition, in a case that the second cell is managed by another system, the wireless communication system may further include an interaction interface for interaction between the systems in an embodiment.

Figure 11:
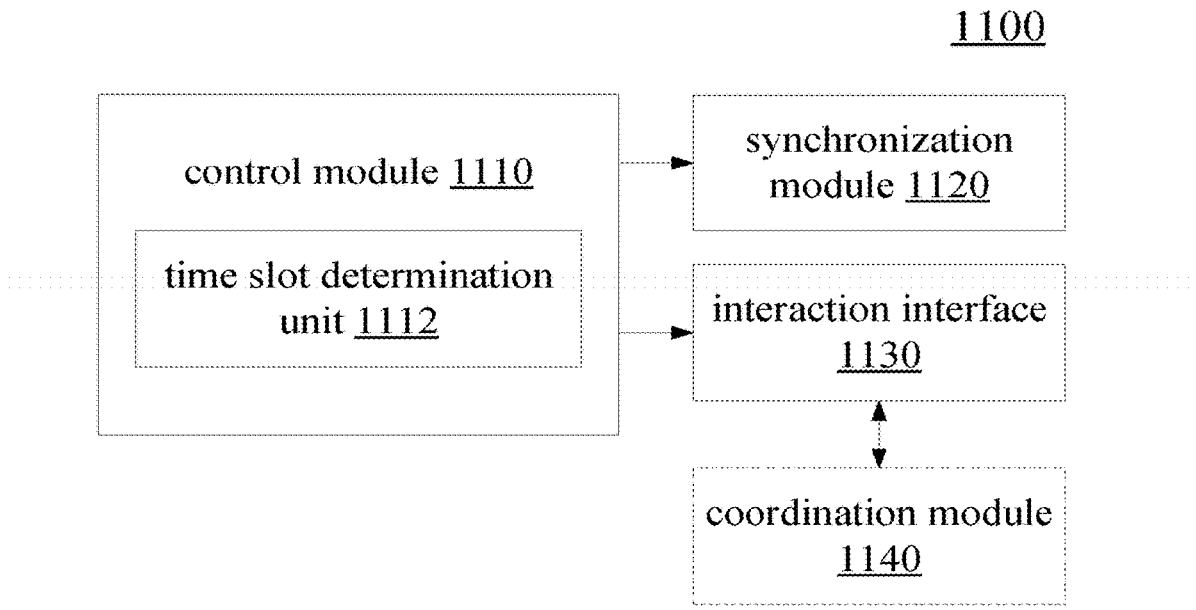
FIG. 11 is a block diagram showing a configuration example of a wireless communication system according to another embodiment.

As shown in FIG. 11, similar to the above wireless communication system 1000, a wireless communication system 1100 include a control module 1110 and a synchronization module 1120. Furthermore, the system 1100 may include an interaction interface 1130.

The interaction interface 1130 is configured to exchange, with the other system, information on the first cell or the second cell including the time slot configuration of the first cell or the second cell, in order that the synchronizing module 1120 synchronizes the time slot configurations of the first cell and the second cell.

It should be noted that, the "exchange, with the other system, information on the first cell or the second cell" as described herein may include mutually sending information between the present system and the other system, or may also include unilaterally sending information. More specifically, in a case that one of two systems is a dominant system (thus which time slot configuration to be used may be determined), only one system is required to provide information. For example, a time slot configuration of the first cell is provided by the dominant system to a dependent system, and the dependent system is required to be adjusted according to the time slot configuration. However, the disclosure is not limited to these specific exemplary interacting manners.

As shown in FIG. 11, in an embodiment, the wireless communication system may further include a coordination module 1140. The coordination module 1140 may be configured to coordinate usages of the unlicensed frequency band by the first cell and the second cell to reduce interference. The information on the first cell or the second cell exchanged by the interaction interface 1130 with the other system may further include the unlicensed frequency band actually used by the first cell or the second cell, for the coordination performed by the coordination unit.

In addition, in another embodiment, the interaction interface may be configured to exchange, with the other system, information on the first cell or the second cell including a coverage area, in order that the synchronization module determines interference on the first cell by the second cell using the unlicensed frequency band based on the coverage area.

In a case that the first cell is at least partially arranged in the coverage range of a third cell managed by the present system, the wireless communication system may further include a user management module in an embodiment.

Figure 12:
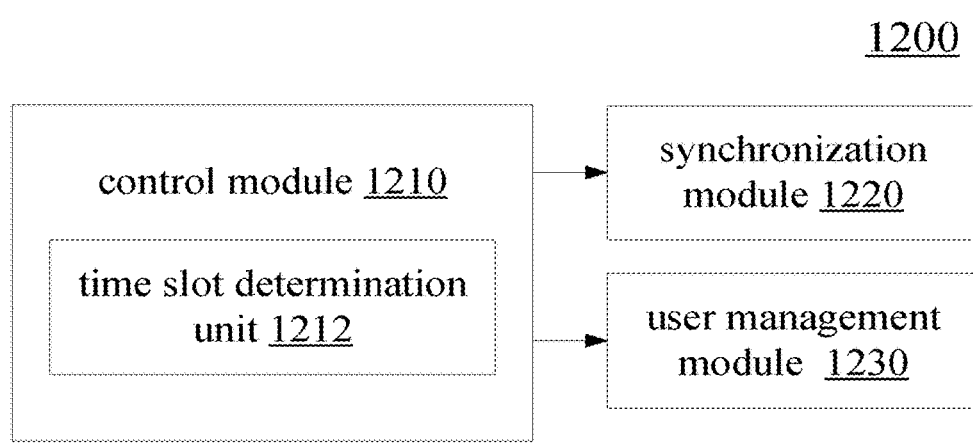
FIG. 12 is a block diagram showing a configuration example of a wireless communication system according to yet another embodiment.

As shown in FIG. 12, similar to the above wireless communication system 1000, a wireless communication system 1200 include a control module 1210 and a synchronization module 1220. Furthermore, the system 1200 also includes a user management module 1230.

The user equipment management module 1230 is configured to determine a user equipment located in the first cell and served by the third cell, instruct the user equipment to add the first cell to perform carrier aggregation with the third cell, and notify the user equipment of the time slot configuration of the first cell.

For example, the user equipment management module 1230 may instruct the user equipment to add the first cell to perform carrier aggregation with a macro cell, and notify the user equipment of the time slot configuration of the first cell, through a downlink shared channel (DL-SCH).

In practice, the adding of the cell and the notifying of the time slot configuration may be implemented via one signaling, or may also be implemented via two signaling. For example, a wireless resource control (RRC) signaling (for example a RRCConnectionReconfiguration signaling) may be issued by the macro cell to send the two kinds of information. The RRC signaling of the macro cell may also be used to instruct the adding of the cell, and the SIB information of the first cell is used to notify the time slot configuration (for example, when the time slot configuration changes after a small cell is added). The RRC signaling and the SIB information are carried by the DL-SCH channel.

In a specific embodiment, in a case that the first cell is a small cell using the unlicensed frequency band and the third cell is a small cell using the licensed frequency band, the user equipment management module may control the user equipment to receive a control signal from the third cell and receive a data signal from the first cell, and thus obtain the important control information over a stable link. In an example, the third cell is configured to be a primary cell for the user equipment, the first cell is configured to be a secondary cell for the user equipment, and communication resources of the first cell and the user equipment are scheduled by the third cell.

Furthermore, in a specific embodiment, the controlling module may control the usage of unlicensed frequency band resources of multiple cells containing the first cell, and the time slot determination module may determine multiple time slot configurations based on the locations of multiple cells.

For example, the time slot determination module may determine multiple time slot configurations according to the types of the area where it locates, to improve the usage efficiency of the unlicensed frequency band. For example, two small cells, which are sufficiently distant apart from each other such that no mutual interference is caused, may have different time slot configurations. As another example, a shorter usage time slot may be set in a case where more authorized users (such as WiFi) are around a small cell A; a longer usage time slot may be set in a case where less authorized users are around a small cell B.

Figure 13:
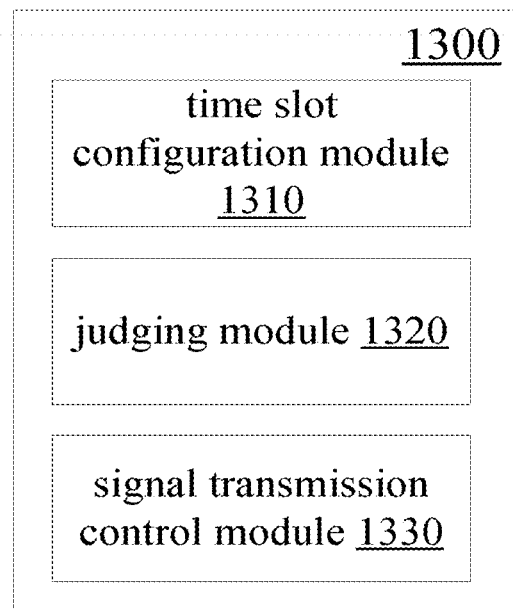
FIG. 13 is a block diagram showing a configuration example of an electronic device according to an embodiment.

FIG. 13 shows an electronic device according to an embodiment of the disclosure. The electronic device 1300 includes a time slot configuration module 1310, a judging module 1320 and a signal transmission control module 1330.

The time slot configuration module 1310 receives time slot configuration information on the electronic device from a control terminal and perform corresponding configuration, wherein the time slot configuration includes a judging time slot and a using time slot.

The judging module 1320 determines in the judging time slot whether another device is using an unlicensed frequency band, based on the time slot configuration.

The signal transmission control module 1330 do not use the unlicensed frequency band to transmit a signal in the judging time slot, based on the time slot configuration. The signal transmission control module 1330 performs a control to use the unlicensed frequency band to transmit a signal in the using time slot in a case that it is determined by the judging module 1320 in the judging time slot that no other device is using the unlicensed frequency band.

The judging module 1320 intermittently detects whether another device is using the unlicensed frequency band, and reports the detected other device to the control terminal in the using time slot.

For example, the judging module 1320 may access a specialized database for managing the unlicensed spectrum resources to determine whether another device is using the unlicensed frequency band in the judging time slot, and the time slot configuration module 1310 may adjust an avoiding time slot based on the information obtained by the judging module 1320 by accessing the database.

In an embodiment, the time slot configuration may further include an avoiding time slot. The signal transmission control module 1330 performs a control to suspend the communication using the unlicensed frequency band in the avoiding time slot, in a case that it is determined by the judging module 1320 in the judging time slot that another device is using the unlicensed frequency band. However, the avoiding time slot may also not be set separately. For example, a part or all of the using time slot may be set as that the unlicensed frequency band is not used therein for avoiding, or the judging time slot may be repeated once again.

In an embodiment, the electronic device 1300 may embed the time slot configuration information into an SIB and send the SIB to a user equipment served by the electronic device.

Based on the time slot configuration information, the user equipment may be in an inactive state in the judging time slot, so no power is consumed to monitor resource scheduling information for the small cell, and monitors only in the using time slot. For example, correlation parameters for discontinuous reception (DRX) may be set according to the time slot configuration.

The electronic device 1300 according to the embodiment may be, for example, arranged in a small cell base station.

Figure 14:
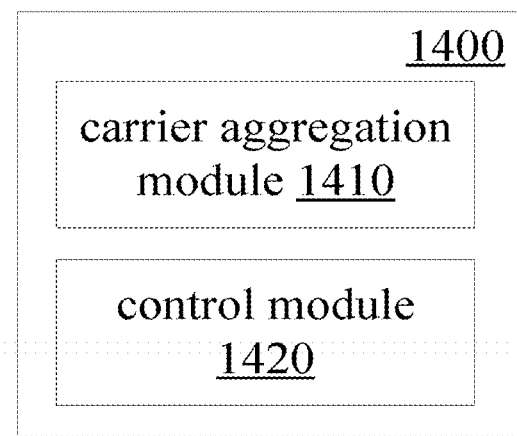
FIG. 14 is a block diagram showing a configuration example of an electronic device according to another embodiment.

FIG. 14 shows an electronic device according to another embodiment. The electronic device 1400 includes a carrier aggregation module 1410 and a control module 1420.

The carrier aggregation module 1410 is configured to perform carrier aggregation communication with a first cell and a second cell via a first carrier operating over an unlicensed frequency band and a second carrier operating over a licensed frequency band, respectively.

The control module 1420 is configured to determine a time slot configuration including a judging time slot and a using time slot for the first cell to use the unlicensed frequency band resource, and control the electronic device 1400 to not monitor a signal of the first cell in the judging time slot and to acquire a control signaling from the second cell at least in the judging time slot. The control signaling includes, for example, a judging result, the setting or adjusting of the avoiding time slot, scheduling information on communication resources for carrying traffic data to be used by the first cell in the using time slot, etc.

The electronic device 1400 may receive the SIB information from the first carrier and acquire a time slot configuration from the SIB information. Alternatively, the electronic device 1400 may receive an RRC signaling from the second carrier and acquire a time slot configuration from the RRC signaling.

In addition, the electronic device 1400 may determine DRX parameters according to the time slot configuration.

In an example, various steps of the above methods and various components and/or units of the above apparatus may be implemented in software, firmware, hardware or a combination thereof. In a case of implementing in software or firmware, a program of a software for implementing the above methods may be installed from a storage medium or a network to a computer (such as the general-purpose computer 1500 shown in FIG. 15) having dedicated hardware. The computer can perform various functions if installed with various programs.

Figure 15:
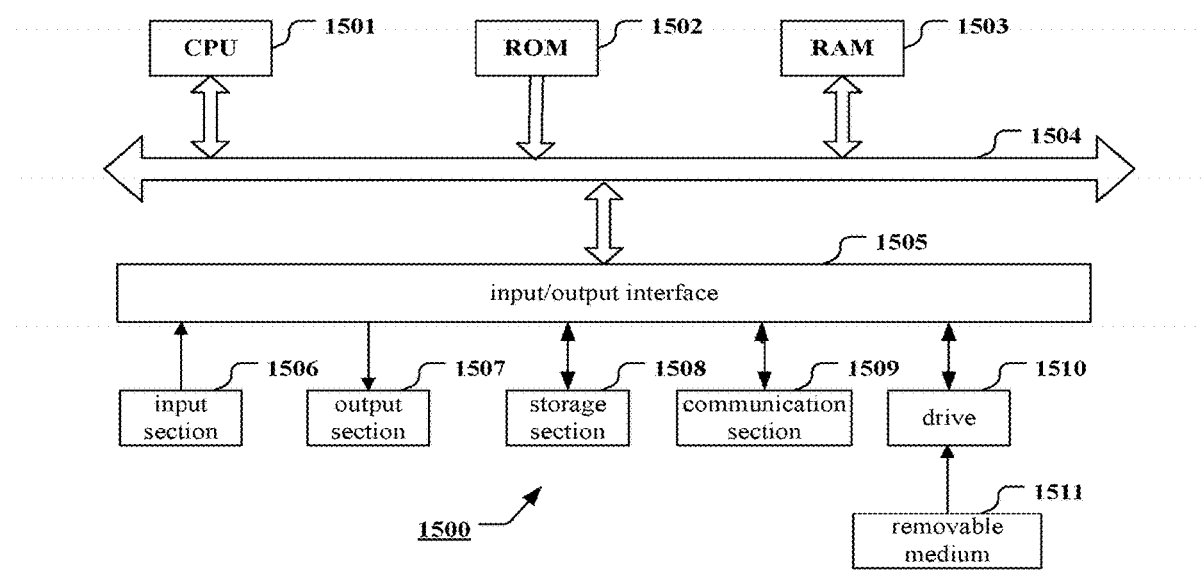
FIG. 15 is a block diagram showing an exemplary structure of a computer for implementing the method and apparatus according to the disclosure.

In FIG. 15, a computation processing unit (i.e., CPU) 1501 executes various processing according to a program stored in a Read Only Memory (ROM) 1502 or a program loaded to a Random Access Memory (RAM) 1503 from a storage section 1508. In the RAM 1503, if necessary, data required for the CPU 1501 in executing various processing and the like is also stored. The CPU 1501, the ROM 1502 and the RAM 1503 are linked to each other via a bus 1504. An input/output interface 1505 is also linked to the bus 1504.

The following components are linked to the input/output interface 1505: an input section 1506 including a keyboard, a mouse and the like, an output section 1507 including a display such as a Cathode Ray Tube (CRT) and a Liquid Crystal Display (LCD), a speaker and the like, the storage section 1508 such as a hard disk and the like, and a communication section 1509 such as a network interface card like a LAN card, a modem and the like. The communication section 1509 performs communication processing via a network such as the Internet. If necessary, a drive 1510 can also be linked to the input/output interface 1505. A removable medium 1511 such as a magnetic disk, an optical disk, a magneto-optical disk, a semiconductor memory and the like is mounted on the drive 1510 as required such that a computer program read out therefrom is installed in the storage section 1508 as required.

In a case that the series of processing above is implemented in software, a program constituting the software is installed from the network such as the Internet or the storage medium such as the removable medium 1511.

It is understood by those skilled in the art that the storage medium is not limited to the removable medium 1511 shown in FIG. 15 in which the program is stored and which is distributed separately from the device so as to provide the program to the user. Examples of the removable medium 1511 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1502, the hard disk contained in the storage section 1508 or the like. Herein, the program is stored in the storage medium, and the storage medium is distributed to the user together with the device containing the storage medium.

Embodiments of the present disclosure also relates to a program product on which machine-readable instruction codes are stored. The instruction codes can perform the methods according to the above embodiment when read and executed by a machine.

Accordingly, the present disclosure also includes storage medium carrying the program product on which the machine-readable instruction codes are stored. The storage media includes a soft-disk, an optical disk, a magnetic disk, a storage card, a storage stick and the like, but is not limited thereto.

Embodiments of the present disclosure further include an electronic device as follows. The electronic device may be a base station/a user equipment, or a chip therein. The user equipment may be a mobile terminal with a communication function, such as a mobile phone, a computer, a smart watch, smart glasses, and a vehicle.

According to an embodiment, an electronic device for a wireless communication system is provided, wherein the wireless communication system contains a small cell. The electronic device includes a circuitry configured to determine an upper limit for the number of small cells using an unlicensed frequency band in a target area according to available unlicensed frequency band resources and an estimated traffic in the target area; and control one or more small cells to stop operating in the unlicensed frequency band in a case that the number of the small cells operating in the unlicensed frequency band is greater than the upper limit, so that the number is not greater than the upper limit.

According to an embodiment, a wireless communication system is provided, which includes a control module and a synchronization module. The control module is configured to control the usage of an unlicensed frequency band by a first cell. The control module includes a circuitry configured to determine a time slot configuration including a judging time slot and a using time slot for the first cell to use the unlicensed frequency band resource, so that the first cell does not use the unlicensed frequency band and determines whether another device is using the unlicensed frequency band in the judging time slot. In a case that it is determined in the judging time slot that no other device is using the unlicensed frequency band, communication is performed using the unlicensed frequency band in the using time slot. The synchronization module includes a circuitry configured to synchronize the time slot configurations of the first cell and a second cell in a case that it is determined that the first cell is interfered by the second cell using the unlicensed frequency band, so that the judging time slots of the first cell and the second cell are synchronized.

In another aspect of the disclosure, an electronic device is provided, which includes a circuitry configured to receive time slot configuration information on the electronic device from a control terminal and perform corresponding configuration, the time slot configuration including a judging time slot and a using time slot; determine in the judging time slot whether another device is using an unlicensed frequency band based on the time slot configuration; based on the time slot configuration, do not use the unlicensed frequency band to transmit a signal in the judging time slot, and use the unlicensed frequency band to transmit the signal in the using time slot in a case that it is determined by the judging module in the judging time slot that no other device is using the unlicensed frequency band; and intermittently detect in the using time slot whether another device is using the unlicensed frequency band, and report the detected other device to the control terminal.

In still another aspect of the disclosure, an electronic device is provided, which includes a circuitry configured to: perform carrier aggregation communication with a first cell and a second cell via a first carrier operating over an unlicensed frequency band and a second carrier operating over a licensed frequency band, respectively; determine a time slot configuration including a judging time slot and a using time slot for the first cell to use the unlicensed frequency band resource, and control the electronic device to not monitor a signal of the first cell in the judging time slot and to acquire a control signaling from the second cell at least in the judging time slot.

As mentioned above, the small cell generating interference may belong to the same system as the current small cell, or may also be a small cell of another system of the same operator or a different operator. Accordingly, different types of coverage areas may be defined. For example, under the coexistence of multiple systems, the coverage range of the secondary cell within the coverage range of the primary cell may be grouped into two types: a first type, i.e., an overlapping area which exists in the coverage ranges of the primary cells belonging to different operators and the unlicensed frequency band may be used in the coverage ranges of the primary cells; and a second type, i.e., an area in the coverage range of only one operator where the unlicensed frequency band may be used.

Figure 16:
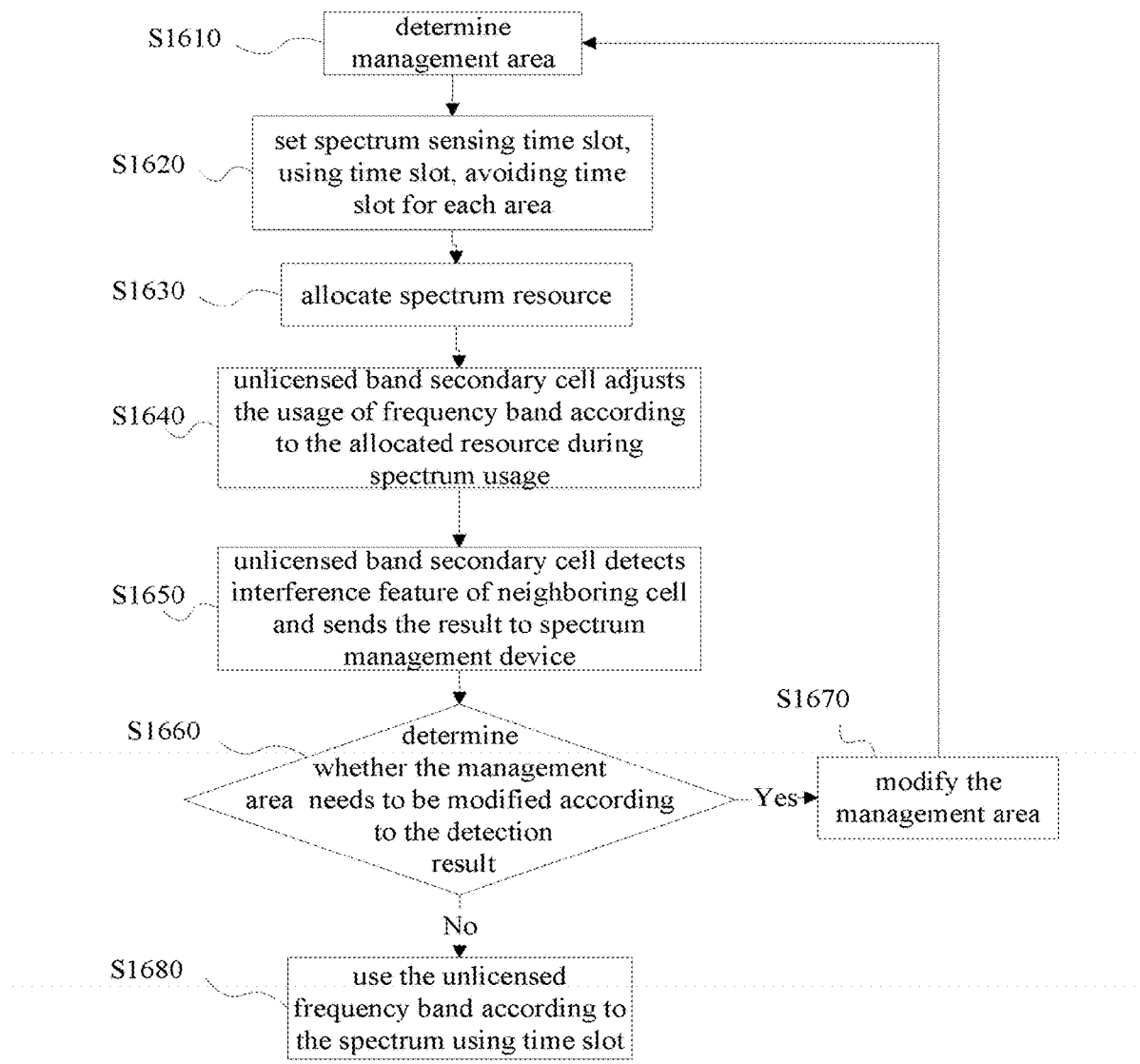
FIG. 16 is a flow chart showing a process example according to an exemplary embodiment.

Next, an exemplary embodiment is illustrated with reference to FIG. 16.

In step S1610, a management area is determined. The management area may be an area of a specific type determined for facilitating management, and spectrum management may be performed for the area in a uniform manner.

Specifically, the type of the area and the management area may be determined by exchanging information on the service area between the operators, such as a coverage range and an area where the unlicensed frequency band may be used.

Next, for the determined management area, time slot setting (S1620), spectrum resource allocation (S1630) and automatically adjustment of the usage of the unlicensed frequency band with the allocated resources (S1640) may be performed in the manner as previously described.

In step S1650, interference feature of the neighboring cell is detected by the secondary cell using the unlicensed frequency band, and the result is sent to a spectrum management device.

Communication systems of different operators may be determined based on the measurement of interference from different systems by the secondary cell and/or the user when the secondary cell uses the unlicensed frequency band to provide the user with additional bandwidths. For example, users of two operators always may detect interference from the neighboring cells at some locations and these cells belong to different operators. For example, the secondary cell may intermittently detect the frequency band (for example, in a intermittent transmission and network listening mode in the LTE system) in the time slot of the secondary cell using the unlicensed frequency band. Through frequency band listening, the secondary cell may detect information from a neighboring secondary cell, such as, an ID of a cell or a spectrum manager ID of the cell. The ID of secondary cell or the manager ID may be determined by a spectrum management device of the system. When an overlapping area exists in primary base stations of different operators, the primary system exchanges information on the ID of the cell or ID of the manager of the cell, and sends the information to the secondary cell. The information may also be sent to a user terminal through the unlicensed frequency band. The base station or the terminal, when detecting the interference of the neighboring cell, may determine whether the interference comes from a cell of the same operator or a cell of a different operator according to the known ID of the cell or the ID of the manager of the cell. If interference of a secondary cell within a primary cell from different operators is detected by the secondary cell or the user terminal in the unlicensed frequency band at a location, it shows that the location is in the above-described area of first type. The secondary cell may send the information to the spectrum management device of the primary cell, for example, through a backbone. The user terminal may send the information to the spectrum management device via the primary cell of the authorized network.

With the information, the spectrum management device may create or modify the range of the area of the first type. Interference within the area of the second type comes from the same operator, and may be eliminated according to the spectrum usage strategy of the operator. After the available spectrum resources in the area are determined, each neighboring cell can automatically select and use a frequency band to avoid interference. For interference among cells from different operators in the area of the first type, interference of neighboring cells may be coordinated by exchanging information between operators.

Based on the information obtained by way of the above example, when it is determined that the management area need to be modified ("Yes" in S1660), the management area is modified (S1670). For example, the manner of spectrum management is adjusted correspondingly based on the change of the area of first type or the area of second type. When the management area need not to be modified ("No" in S1660), the unlicensed frequency band is used continually according to the spectrum using time slot (S1680).

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosed by describing the above embodiment of the present disclosure, it should be noted that each of the above example and embodiment is not for limiting but for illustrating. Those skilled in the art may make various modifications, improvements and equivalents within the spirit and scope of the appended claims. The modifications, improvements and equivalents should also be included in the protection scope of the present disclosure.

The invention claimed is:

1. A base station controlling apparatus for a wireless communication system containing a small cell, the base station controlling apparatus comprising:
   a memory; and
   circuitry configured to
      determine an estimated upper limit for the number of small cells using an unlicensed frequency band in a target area according to available unlicensed frequency band resources and an estimated traffic in the target area; and
      control one or more small cells to operate or stop operating in the unlicensed frequency band based on the estimated upper limit for the number, such that the number of the small cells operating in the unlicensed frequency band is not greater than the estimated upper limit for the number.

2. The base station controlling apparatus according to claim 1, wherein in a case that the number of small cells operating in the unlicensed frequency band in the target area is not greater than the upper limit, the probability that a communication using the unlicensed frequency band satisfies a predetermined communication quality level reaches a predetermined threshold.

3. The base station controlling apparatus according to claim 1, wherein
   the circuitry is further configured to specify a time slot configuration for the small cell using the unlicensed frequency band, and
   the time slot configuration comprises:
      a judging time slot in which the communication using the unlicensed frequency band is stopped and it is determined whether another device is using the unlicensed frequency band;
      an avoiding time slot in which the communication using the unlicensed frequency band is suspended in a case that it is determined in the judging time slot that another device is using the unlicensed frequency band; and
      a using time slot in which the unlicensed frequency band is used for communication in a case that it is determined in the judging time slot that no other device is using the unlicensed frequency band.

4. The base station controlling apparatus according to claim 3, wherein the circuitry is further configured to adjust a duration of the avoiding time slot in the time slot configuration according to a usage duration of the unlicensed frequency band by the other device detected in the avoiding time slot.

5. The base station controlling apparatus according to claim 1, wherein the circuitry is further configured to determine a potential interfering small cell for the small cell of the present system according to coverage area information of a small cell in a neighboring system obtained from the neighboring system or a detection on a signal of a small cell of the neighboring system by the small cell of the present system.

6. The base station controlling apparatus according to claim 5, wherein
   the circuitry is further configured to, in a case that the potential interfering small cell is using the unlicensed frequency band, notify the neighboring system to control the potential interfering small cell to use a judging time slot synchronized with that of the small cell of the present system, or make the small cell of the present system use a judging time slot synchronized with that of the potential interfering small cell, and
   communication using the unlicensed frequency band is stopped and it is determined whether another device is using the unlicensed frequency band in the judging time slot.

7. The base station controlling apparatus according to claim 5, wherein the circuitry is further configured to, in a case that the potential interfering small cell is using the unlicensed frequency band, notify the neighboring system of the unlicensed frequency band actually used by the small cell of the present system, or acquire the unlicensed frequency band actually used by the potential interfering small cell from the neighboring system and control the small cell of the present system to not use the unlicensed frequency band.

8. The base station controlling apparatus according to claim 5, wherein the circuitry is configured to, in a case that the potential interfering small cell exists in the target area, determine upper limits of the number of the small cells of the present system and the potential interfering small cells using the unlicensed frequency band in the target area according to traffics of the small cells of the present system and the potential interfering small cells in the target area.

9. The base station controlling apparatus according to claim 8, wherein the circuitry is configured to determine a number allocation for small cells of the present system and potential interfering small cells using the unlicensed frequency band in the target area according to a ratio of the traffic of small cells of the present system to the traffic of the potential interfering small cells.

10. A base station controlling method fora wireless communication system containing a small cell, the method comprising:
  determining an estimated upper limit for the number of small cells using an unlicensed frequency band in a target area according to available unlicensed frequency band resources and an estimated traffic in the target area; and
  controlling one or more small cells to operate or stop operating in the unlicensed frequency band based on the estimated upper limit for the number, such that the number of the small cells operating in the unlicensed frequency band is not greater than the estimated upper limit for the number.

11. The base station controlling method according to claim 10, further comprising:
  specifying a time slot configuration for the small cell using the unlicensed frequency band, wherein the time slot configuration comprises:
    a judging time slot in which the communication using the unlicensed frequency band is stopped and it is determined whether another device is using the unlicensed frequency band;
    an avoiding time slot in which the communication using the unlicensed frequency band is suspended in a case that it is determined in the judging time slot that another device is using the unlicensed frequency band; and
    a using time slot in which the unlicensed frequency band is used for communication in a case that it is determined in the judging time slot that no other device is using the unlicensed frequency band.

12. The base station controlling method according to claim 10, further comprising:
  adjusting a duration of the avoiding time slot in the time slot configuration according to a usage duration of the unlicensed frequency band by the other device detected in the avoiding time slot.

* * * * *